(12) United States Patent
Yamakura et al.

(10) Patent No.: US 9,841,089 B2
(45) Date of Patent: Dec. 12, 2017

(54) ACTUATOR

(71) Applicant: THK CO., LTD., Tokyo (JP)

(72) Inventors: Wataru Yamakura, Tokyo (JP); Takaya Kono, Tokyo (JP); Mitsuru Akiyoshi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/895,973

(22) PCT Filed: May 26, 2014

(86) PCT No.: PCT/JP2014/063820
§ 371 (c)(1),
(2) Date: Dec. 4, 2015

(87) PCT Pub. No.: WO2014/196397
PCT Pub. Date: Dec. 11, 2014

(65) Prior Publication Data
US 2016/0116033 A1 Apr. 28, 2016

(30) Foreign Application Priority Data

Jun. 7, 2013 (JP) .................................. 2013-120844

(51) Int. Cl.
*F16H 25/22* (2006.01)
*F16H 25/24* (2006.01)
(Continued)

(52) U.S. Cl.
CPC ..... *F16H 25/2204* (2013.01); *F16C 29/0602* (2013.01); *F16C 29/063* (2013.01);
(Continued)

(58) Field of Classification Search
CPC ............. F16H 25/2204; F16H 25/2418; F16H 2025/2031; F16H 2025/2034;
(Continued)

(56) References Cited

U.S. PATENT DOCUMENTS

| 5,590,580 A * | 1/1997 | Nagai | ..................... | B23Q 5/26 |
| | | | | 74/424.82 |
| 6,344,718 B1 * | 2/2002 | Nagai | ..................... | B23Q 1/58 |
| | | | | 310/80 |

(Continued)

FOREIGN PATENT DOCUMENTS

| JP | 2005-344902 A | 12/2005 |
| JP | 2010-214501 A | 9/2010 |
| JP | 2013-019534 A | 1/2013 |

OTHER PUBLICATIONS

Japanese Office Action for JP 2013-120844 dated Nov. 11, 2014.
(Continued)

*Primary Examiner* — William Kelleher
*Assistant Examiner* — Joseph H Brown
(74) *Attorney, Agent, or Firm* — Sughrue Mion, PLLC

(57) ABSTRACT

To provide an actuator with which side face covers can be easily attached and detached without damaging a top face cover, and workability is enhanced, and cost can be reduced without upsizing the actuator, by fastening and fixing the actuator to a base stand from above the actuator in a state in which the side face covers are removed.

In an actuator having a long screw shaft with a first roller rolling groove in a spiral shape formed on an outer periphery, an inner block where a screw hole through which the screw shaft penetrates is formed, and which has a second roller rolling groove that is formed on an outer periphery to be parallel with the screw shaft, an outer rail that faces the second roller rolling groove, and a plurality of rollers that are respectively arranged between the screw shaft and the inner block, and between the inner block and the outer rail, side face covers that are laid between a pair of end portion members that are installed at both end portions of the screw shaft, and a top face cover that is disposed to close an opening portion that is formed between the side face covers (Continued)

and is opened parallel with the screw shaft are included, the side face covers each includes a top plate that is formed to be parallel with the top face cover, and a side plate that hangs from one end of the top plate, and the end portion members each has posture retaining device that contacts a corner portion of the top plate and the side plate.

4 Claims, 6 Drawing Sheets

(51) Int. Cl.
*F16C 29/06* (2006.01)
*F16H 25/20* (2006.01)
*F16C 29/08* (2006.01)

(52) U.S. Cl.
CPC ............ *F16C 29/08* (2013.01); *F16C 29/082* (2013.01); *F16H 25/20* (2013.01); *F16H 25/2418* (2013.01); *F16C 29/06* (2013.01); *F16H 2025/2031* (2013.01)

(58) Field of Classification Search
CPC ....... F16H 2025/204; F16H 2025/2214; F16H 25/2247; F16H 25/20; F16H 25/22; F16H 25/24; F16C 29/043; F16C 29/0602; F16C 29/063; F16C 29/084; F16C 29/088; F16C 43/045; F16C 29/04; F16C 29/06; F16C 29/08; Y10T 74/1872; Y10T 74/18712
USPC .......................................................... 384/43
See application file for complete search history.

(56) References Cited

U.S. PATENT DOCUMENTS

| | | | | |
|---|---|---|---|---|
| 6,446,520 B1* | 9/2002 | Nagai | ..................... | F16H 25/24 |
| | | | | 205/213 |
| 6,520,320 B1* | 2/2003 | Wang | ...................... | B23Q 1/58 |
| | | | | 198/750.1 |
| 7,066,649 B2* | 6/2006 | Nagai | ................... | B23Q 11/08 |
| | | | | 277/410 |
| 2012/0285278 A1* | 11/2012 | Sakai | ................. | F16H 25/2204 |
| | | | | 74/89.33 |

OTHER PUBLICATIONS

Japanese Decision to Grant for JP 2013-120844 dated Apr. 21, 2015.
International Search Report of PCT/JP2014/063820 dated Aug. 26, 2014.

* cited by examiner

ACTUATOR

CROSS REFERENCE TO RELATED APPLICATIONS

This is a National Stage of International Application No. PCT/JP2014/063820 filed May 26, 2014, claiming priority based on Japanese Patent Application No. 2013-120844 filed Jun. 7, 2013, the contents of all of which are incorporated herein by reference in their entirety.

TECHNICAL FIELD

The present invention relates to an actuator, and particularly relates to a full cover type actuator including a dustproof mechanism.

BACKGROUND ART

Conventionally, there has been known a full cover type actuator including a dustproof mechanism, with the entire surface of the actuator structure section covered with a cover or the like. Further, as the form of an actuator like this, various forms are known, such as a rod type having a rod that is assembled to be extendable and contractible from the end portion of the actuator, and a slider type having a slider that moves along a longitudinal direction, on the top face of the actuator.

A full cover type actuator like this can be fixed to a base stand such as a worktable by various fixing methods, but has the problem that workability is unfavorable when a worker crawls under a base stand and attaches the actuator from below. In order to solve the problem like this, the actuator described in Patent Literature 1 has such a configuration that by removing the cover, the actuator is attached to a base stand with bolts from above the actuator.

CITATION LIST

Patent Literature

[Patent Literature 1] Japanese Patent Laid-Open No. 2013-19534

DISCLOSURE OF THE INVENTION

Problems to be Solved by the Invention

However, in the rod type actuator as described in Patent Literature 1, the cover can be easily removed, but a slider type actuator has the configuration in which an opening portion is formed on the actuator top face so that a slider can move, and the opening portion is closed with a top face cover. The top face cover is composed of a stainless steel tape in a thin film form, and therefore, is easily damaged when a stress along the width direction of the top surface cover is applied to the end portion of the top face cover. Consequently, a slider type actuator has the problem that unless positioning of the side face cover is performed accurately, when the side face cover is attached to the side face of the actuator, the side face cover contacts the top face cover which is stretched across the top face of the actuator, and the stress along the width direction is applied to the end portion of the top face cover, and thereby damages the top face cover. Further, since the side face cover cannot be easily attached and detached for the reason like this, the actuator cannot be fastened and fixed to the base stand from above the actuator with bolts or the like, at the time of installing the actuator on a base stand or the like, and there is no other choice but to adopt such a configuration that the actuator is fixed from below the base stand as hitherto, or such a configuration that flanges are formed on the side faces of the actuator, and the actuator is fastened and fixed to the base stand with bolts from above the actuator via the flanges, whereby a slider type actuator has the problem that attaching workability is still unfavorable, and in the case of forming the flanges, the actuator itself is upsized to make cost reduction difficult.

The present invention is made to solve the above described problem, and has an object to provide an actuator with which side face covers can be easily attached and detached without damaging a top face cover, workability is enhanced, and cost can be reduced without upsizing the actuator, by fastening and fixing the actuator to a base stand from above the actuator in a state in which the side covers are removed.

Means for Solving the Problems

An actuator according to the present invention is an actuator having a long screw shaft with a first roller rolling groove in a spiral shape formed on an outer periphery, an inner block where a screw hole through which the screw shaft penetrates is formed, and which has a second roller rolling groove that is formed on an outer periphery to be parallel with the screw shaft, an outer rail that faces the second roller rolling groove, and a plurality of rollers that are respectively arranged between the screw shaft and the inner block, and between the inner block and the outer rail, including a pair of side face covers that are laid between a pair of end portion members that are installed at both end portions of the screw shaft, and a top face cover that is disposed to close an opening portion that is formed between the side face covers, and is opened parallel with the screw shaft, wherein the side face covers each includes a top plate that is formed to be parallel with the top face cover, and a side plate that hangs from one end of the top plate, and the end portion members each has a posture retaining device that contacts a corner portion of the top plate and a side plate of the side face cover.

Effects of the Invention

According to the present invention, the top face cover can be prevented from being damaged at the time of attaching and detaching the side face covers to and from the end portion members, workability can be enhanced and cost can be reduced without upsizing the actuator.

MODE FOR CARRYING OUT THE INVENTION

Hereinafter, embodiments of an actuator according to the present invention will be described with reference to the drawings. Note that the following embodiments do not restrict the invention according to each of claims, and all of combinations of features described in the embodiments are not always essential to the solution of the invention.

First Embodiment

Figure 1:
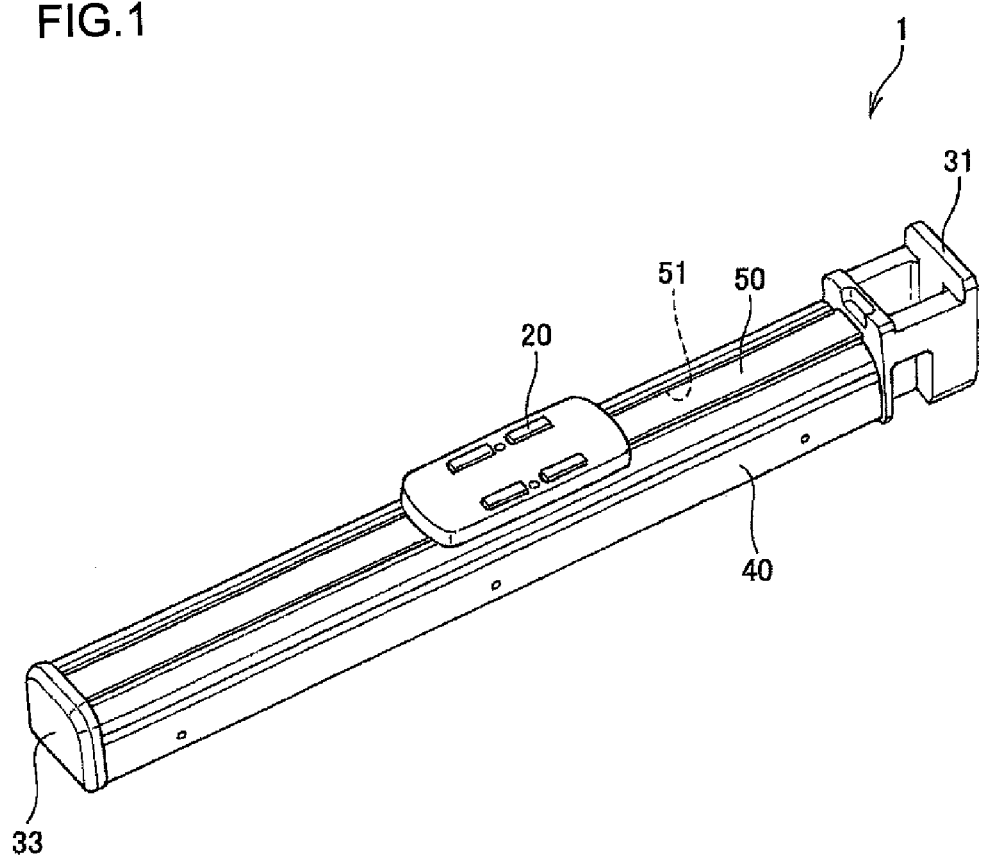
FIG. 1 is a perspective view of an actuator according to a first embodiment of the present invention.
Figure 2:
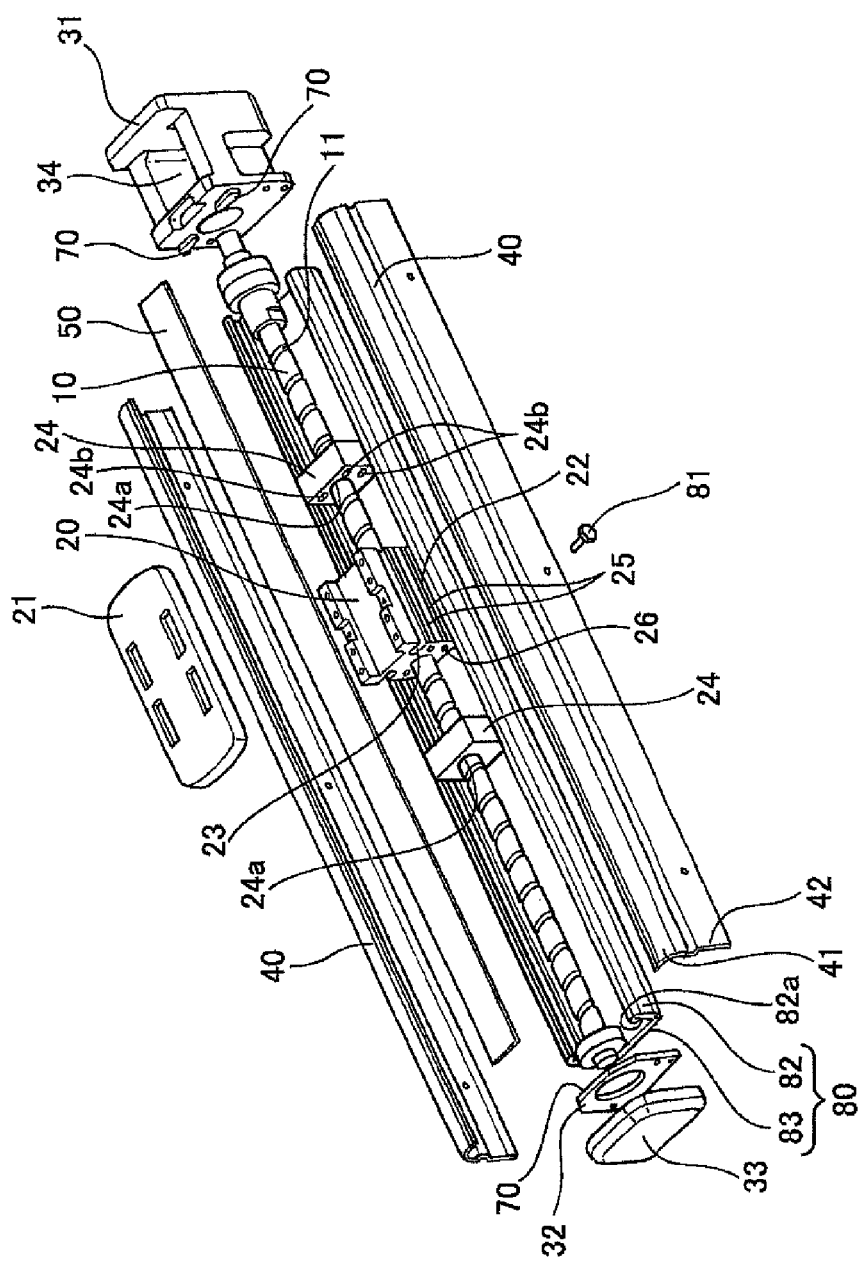
FIG. 2 is an exploded view of the actuator according to the first embodiment of the present invention.
Figure 3:
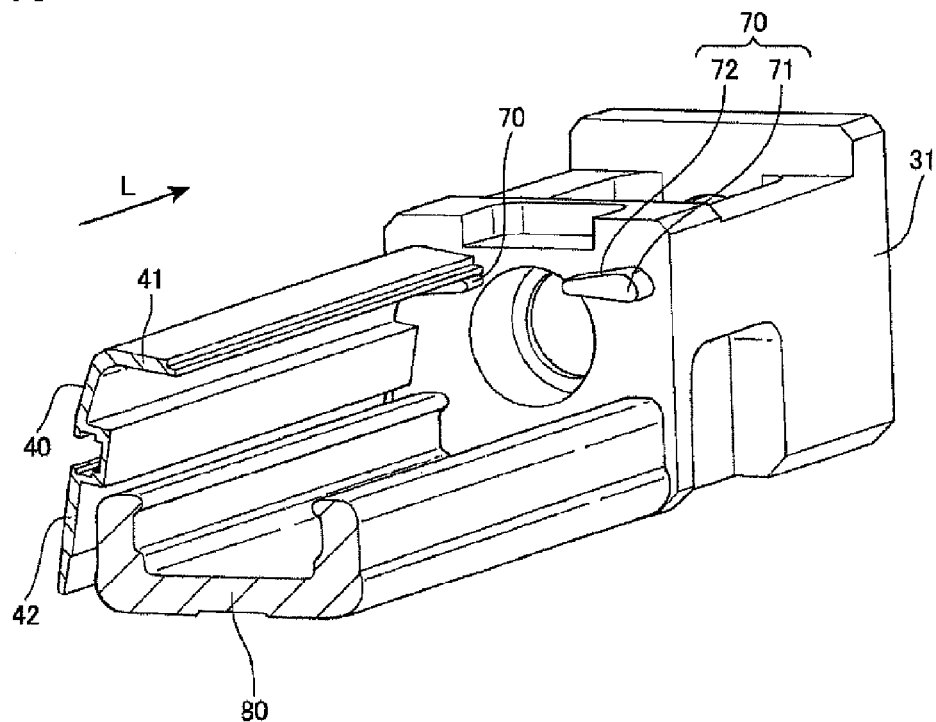
FIG. 3 is a partially exploded perspective view for explaining a configuration of an end portion member of the actuator according to the first embodiment of the present invention.
Figure 4:
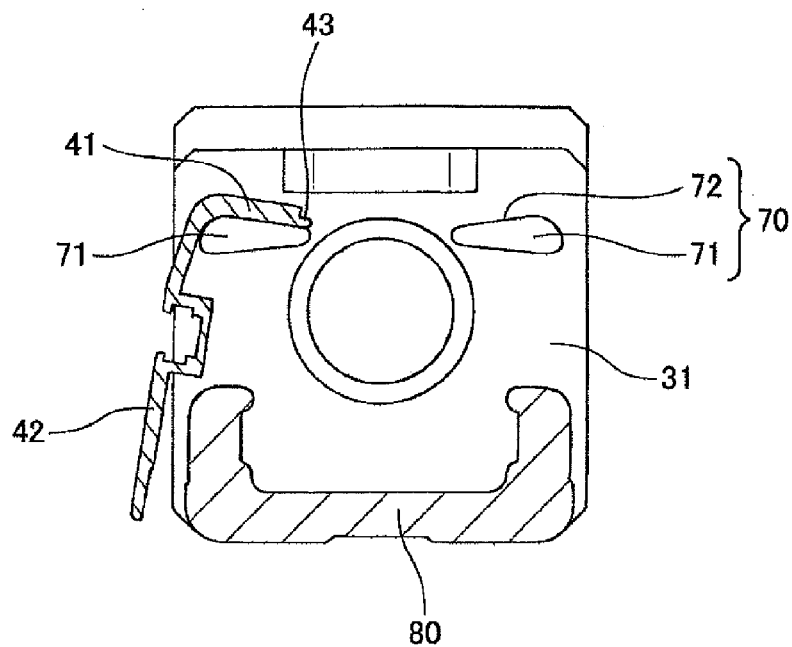
FIG. 4 is an arrow view in a direction L in FIG. 3.
Figure 5:
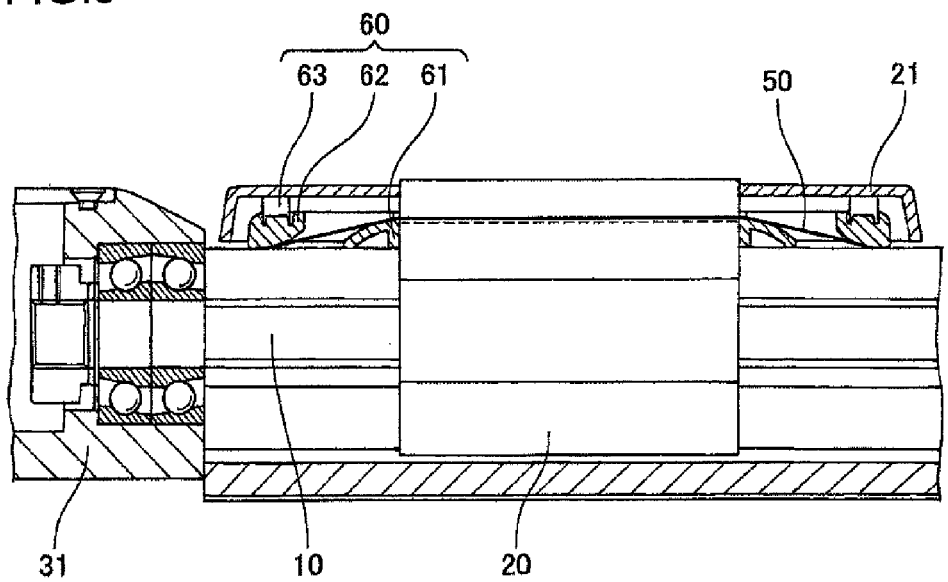
FIG. 5 is a sectional view in a longitudinal direction of the actuator according to the first embodiment of the present invention.
Figure 6:
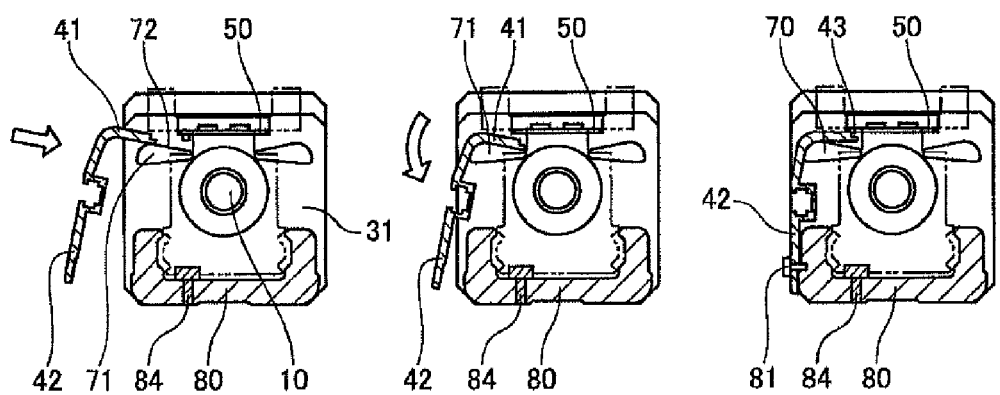
FIG. 6 is an assembly explanatory view showing a method for attaching a side face cover of the actuator according to the first embodiment of the present invention, in which (1) shows a state in which the side face cover is inserted, (2) shows a state in which the side face cover is rotated around a rotation axis parallel with a screw shaft, and (3) shows a state in which the side face cover is fastened and fixed.

FIG. 1 is a perspective view of the actuator according to a first embodiment of the present invention, FIG. 2 is an exploded view of the actuator according to the first embodiment of the present invention, FIG. 3 is a partially exploded perspective view for explaining a configuration of an end portion member of the actuator according to the first embodiment of the present invention, FIG. 4 is an arrow view in a direction L in FIG. 3, FIG. 5 is a sectional view in a longitudinal direction of the actuator according to the first embodiment of the present invention, and FIG. 6 is an assembly explanatory view showing a method for attaching a side face cover of the actuator according to the first embodiment of the present invention, in which (1) shows a state in which the side face cover is inserted, (2) shows a state in which the side face cover is rotated around a rotation axis parallel with a screw shaft, and (3) shows a state in which the side face cover is fastened and fixed.

As shown in FIG. 1, an actuator 1 according to the present embodiment is formed into a lean and long box shape having a pair of side face covers 40 that extend along a longitudinal direction, and are laid between a first end portion member 31 and a second end portion member that will be described later, a pair of end portion members formed of the first end portion member 31 and the second end portion member 32 which are installed at both ends of the side face covers 40, and a top face cover 50 that closes an opening portion 51 that is formed along a longitudinal direction between facing surfaces of the side face covers 40. The second end portion member 32 is covered with a side lid 33, and forms an external shape of the actuator 1 according to the present embodiment, and in the first end portion member 31 and the second end portion member 32, posture retaining devices 70 that will be described later are formed. Further, an inner block 20 that reciprocates along the opening portion 51 is attached via a detour device 60 for causing the top face cover 50 which is located in a position that is superimposed on the inner block 20 to make a detour.

As shown in FIG. 2, inside the actuator 1 according to the present embodiment, a screw shaft 10 where a first roller rolling groove 11 in a spiral shape is formed on an outer surface, and which extends along the longitudinal direction is supported in a rotatable state between the first end portion member 31 and the second end portion member 32, and one end thereof is connected to a drive motor not illustrated that is disposed inside a drive device housing portion 34 that is formed in the first end portion member 31. Further, the screw shaft 10 is inserted through a ball screw nut 22 that is formed at a lower end of the inner block 20, and is engaged, with a ball screw roller not illustrated interposed between the screw shaft 10 and the inner block 20. Further, in the inner block 20, two second load roller rolling grooves 25 that are formed parallel with the screw shaft 10 are formed on each of both side surfaces, four in total. Further, a roller return passage 26 that is bored parallel with the screw shaft 10 is formed to correspond to the second load roller rolling groove 25. Furthermore, a pair of lid bodies 24 are attached to both end surfaces of the inner block 20.

The inner block 20 has reciprocating movement thereof guided by an outer rail 80 that is disposed at a lower end, and the outer rail 80 has a bottom portion 83 that extends along the longitudinal direction, and a pair of side wall portions 82 that are vertically provided from both ends of the bottom portion 83 and face both side faces of the ball screw nut 22. Further, a moving plate 21 is attached to the inner block 20 in such a manner as to sandwich the top face cover 50 from above and below. Further, in the side wall portion 82, a second roller rolling groove 82a is formed to face the second load roller rolling grooves 25, and the second load roller rolling grooves 25 and the second roller rolling groove 82a form a roller rolling path. Further, in a lid body 24, a through-hole 24a through which the screw shaft 10 is inserted, and direction changing paths 24b that cause the roller rolling path and the roller return passage 26 to communicate with each other are formed.

The inner block 20 is assembled to the outer rail 80 via a plurality of rollers not illustrated, and the rollers endlessly circulate by rolling in an endless track that is constituted of the roller rolling path, the direction changing paths 24b and the roller return passage 26 to guide the inner block 20 to be capable of reciprocating along the outer rail 80.

The side face cover 40 has a top plate 41 that extends parallel with the top face cover 50, and a side plate 42 that hangs from the top plate 41. Further, at an end portion of the top plate 41, a sealing portion 43 that contacts the top face cover 50 is formed. The sealing portion 43 may contact the top face cover in any manner as long as the sealing portion 43 can seal the top face cover 50, but the sealing portion 43 is preferably magnetically attached to the top face cover 50 by a permanent magnet or the like being attached to the sealing portion 43, for example. To the top face cover 50, a stainless steel tape or the like having magnetism is preferably applied. Furthermore, the side face cover 40 is attached and fixed by the side plate 42 being fastened to the outer rail 80 with fastening bolts 81.

Next, with reference to FIG. 5, the detour device 60 which is formed in the inner block 20 will be described. The detour device 60 includes a first guide portion 61 that is attached to the inner block 20, and a second guide portion 62 that is urged by an urging device 63 that is attached to a lower end of the moving plate 21. Since the top face cover 50 is lifted by the first guide portion 61, the top face cover 50 and the inner block 20 do not contact each other, and the top face cover 50 is laid between the moving plate 21 and the inner block 20 by passing through a lower side of the second guide portion 62 and an upper side of the first guide portion 61 from outside of the moving plate 21. Since the detour device is thus configured, the top face cover 50 and the inner block 20 are configured not to interfere with each other by reciprocating movement of the inner block 20. The top face cover 50 is formed to have a wider width than the opening portion 51, and closes the opening portion 51 by being disposed along the opening portion 51 under the side face covers 40.

By being configured as above, in the actuator 1 according to the present embodiment, the inner block 20 is attached to be capable of reciprocating in an axial direction of the screw shaft, with rotational movement of the screw shaft 10, by rotation of the drive motor.

Further, since the opening portion 51 which is formed along a trajectory of movement of the inner block 20 can always keep a closed state by the top face cover 50, by the detour device 60, dust that is generated from sliding portions of the screw shaft 10 and the ball screw nut 22, sliding portions of the ball screw nut 22 and the outer rail 80 and the like does not leak outside through the opening portion 51.

As shown in FIG. 3 and FIG. 4, in the first end portion member 31, the posture retaining devices 70 which prevent the top face cover 50 and the side face covers 40 from contacting one another at a time of attaching and detaching the side face covers 40 are formed. In the second end portion member 32, the posture retaining devices 70 in the same shapes are also formed to face the posture retaining devices 70 which are formed in the first end portion member 31.

The posture retaining device 70 includes a base point portion 71 that contacts a base end side of the top plate 41 of the side face cover 40, and an inclined surface 72 that extends by inclining a predetermined angle from the base point portion 71. The posture retaining device 70 prevents damage to the top face cover 50 at the time of attaching and detaching the side face cover 40 by allowing the side plate 42 to rotate around the rotation axis parallel with the screw shaft 10 with the base end side of the top plate 41 of the side face cover 40 as a base point.

That is, as shown in FIG. 4, in the side face cover 40 which is attached to the outer rail 80, the side plate 42 is allowed to rotate around the rotation axis parallel with the screw shaft 10 to a direction to be away from the outer rail 80 with the base end side of the top plate 41 as the base point, and the top plate 41 is rotated to a position parallel with the inclined surface 72, whereby the top plate 41 and the inclined surface 72 abut on each other to restrict rotation of the side face cover 40. By being configured like this, the side face cover 40 rotates around the rotation axis parallel with the screw shaft 10, and thereby moves the sealing portion 43 in a direction to be away from the top face cover 50, whereby a horizontal component stress can be reduced in the end portion of the top face cover 50, and damage to the top face cover 50 is prevented. As above, the inclined surface 72 inclines the predetermined angle from a width direction of the top face cover 50, and is provided to extend parallel with the top plate 41 when the top plate 41 rotates around the rotation axis parallel with the screw shaft 10.

Next, with reference to FIG. 6, a method for attaching the side face cover of the actuator 1 according to the present embodiment will be described. Detachment of the side face cover 40 can be performed in a reverse procedure from the attaching method.

As shown in FIG. 6 (1), the actuator 1 according to the present embodiment is fastened and fixed to the base stand by the fixing bolt 84 from above the outer rail 80 in the state in which the side face covers 40 are removed. Thereafter, the side face cover 40 is inserted in such a manner that the top plate 41 of the side face cover 40 is caused to slide along the inclined surface 72. In the position where the side face cover 40 is superimposed with the inner block 20, the side face cover 40 is inserted in a groove 23 which is formed in the inner block 20, and is assembled to be butted to a groove bottom.

As shown in FIG. 6 (2), after the side face cover 40 is inserted until the base end side of the top plate 41 and the base point portion 71 abut on each other, the side plate 42 is rotated around the rotation axis parallel with the screw shaft with the base end side of the top plate 41 as the base point. Since with the rotation, the sealing portion 43 moves in a direction to approach the top face cover 50, the sealing portion 43 does not apply an unnecessary horizontal component stress to the top face cover 50, and therefore, the sealing portion 43 contacts the top face cover 50 without damaging the end portion of the top face cover 50 and can close the opening portion 51. The side face cover 40 rotates while sliding on the groove bottom in the range of the groove width of the groove 23 of the inner block 20, and therefore positioning of the side face cover 40 can be performed easily.

As shown in FIG. 6 (3), the side plate 42 is fastened and fixed to the outer rail 80 with the fastening bolt 81 in the state in which the sealing portion 43 closes the top face cover 50.

In this manner, in the actuator 1 according to the present embodiment, the side face cover 40 can be easily attached and detached without damaging the top face cover 50 by rotating the side face cover 40 around the rotation axis parallel with the screw shaft 10 via the posture retaining device 70, and the actuator 1 is fastened and fixed to the base stand with the fixing bolt 84 from above the actuator 1 according to the present embodiment in the state in which the side face cover 40 is removed, whereby workability is enhanced, and cost can be reduced without upsizing the actuator 1.

Further, the posture retaining device 70 can allow the side plate 42 to rotate around the rotation axis parallel with the screw shaft 10 with the base end portion of the top plate 41 of the side face cover 40 as the base point, and therefore, the rotational operation of the aforementioned side face cover 40 can be reliably realized with the simple configuration.

Further, when the side face cover 40 is rotated around the rotation axis parallel with the screw shaft 10, the top plate 41 and the inclined surface 72 abut on each other to restrict rotation of the side plate 42, and therefore, the side face cover can be prevented from erroneously contacting the top face cover 50 with the rotational operation.

Further, the inclined surface 72 functions as a restriction section that restricts rotation of the side face cover 40 by abutting on the top plate 41, and therefore, can contribute to enhancement in attaching workability and cost reduction due to the fact that the base point portion 71 and the inclined surface 72 can be integrally configured.

Second Embodiment

In the actuator 1 according to the first embodiment that is described above, explanation is made about the case where the posture retaining device 70 is integrally formed by the base point portion 71 and the inclined surface 72. In an actuator of a second embodiment that will be described next, explanation will be made about an example of posture retaining device having a form different from the first embodiment. Note that the same or similar members as or to those in the case of the aforementioned first embodiment will be assigned with the same reference numerals and explanation thereof will be omitted.

Figure 7:
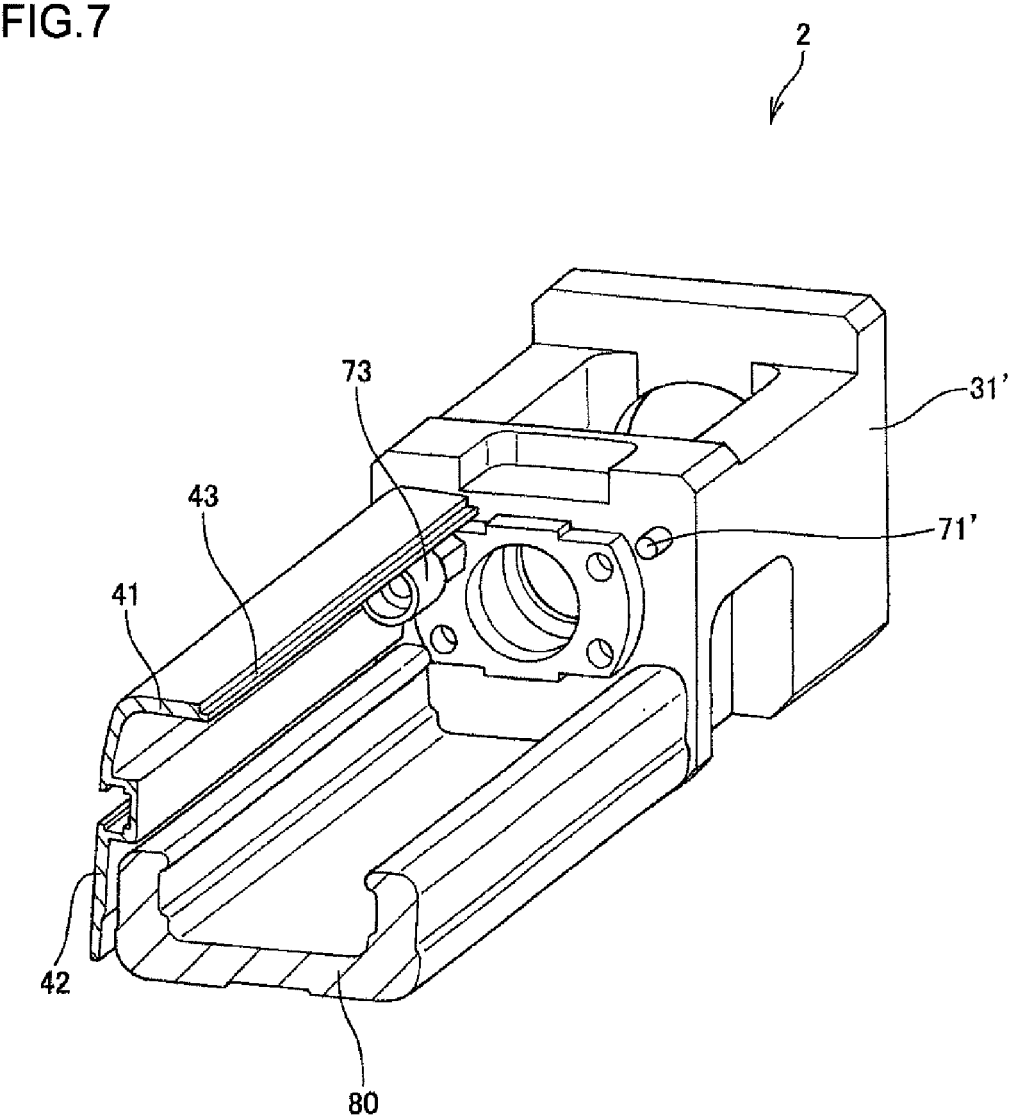
FIG. 7 is a partially exploded perspective view for explaining a configuration of an end portion member of an actuator according to a second embodiment of the present invention.
Figure 8:
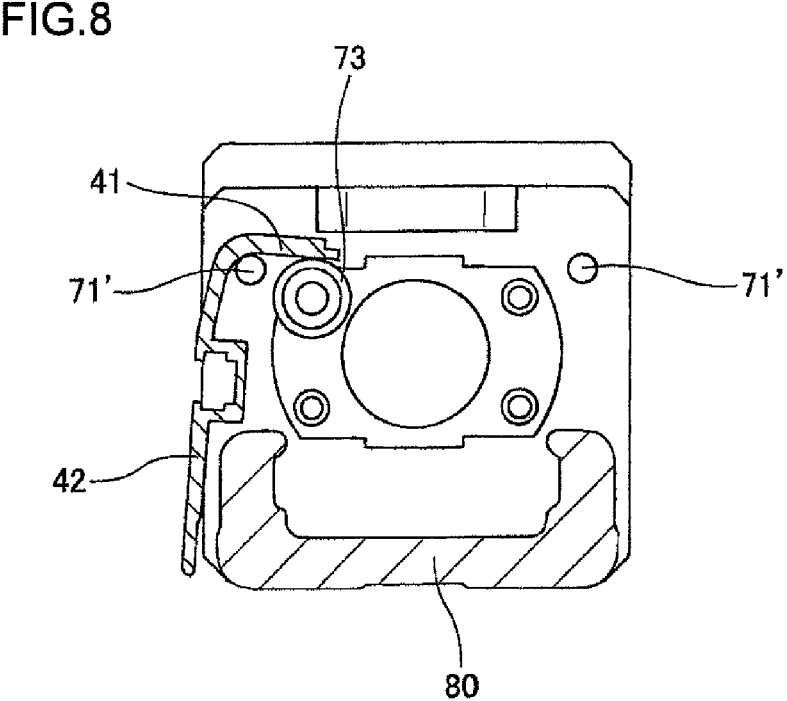
FIG. 8 is an arrow view in a direction L in FIG. 7.

FIG. 7 is a partially exploded perspective view for explaining a configuration of an end portion member of the actuator according to the second embodiment of the present invention, and FIG. 8 is an arrow view in a direction L in FIG. 7.

As shown in FIG. 7, in a first end portion member 31' of the actuator 2 according to the present embodiment, a support guide pin 71' as a base point portion is provided to protrude on a surface facing a second end portion member not illustrated. Further, a stopper 73 that is separated from the pin 71' and protrudes from the first end portion member 31' is attached.

As shown in FIG. 8, the stopper 73 is attached at a position that restricts rotation of the top plate 41 when the side face cover 40 is rotated around the rotation axis parallel with the screw shaft 10 similarly to the actuator 1 according to the aforementioned first embodiment, and thereby an operational effect similarly to the posture retaining device 70 of the actuator 1 according to the first embodiment can be provided.

According to the actuator 2 according to the present embodiment, since the posture retaining device is configured by the pin 71' and the stopper 73, a range of a rotational operation can be finely adjusted by properly changing the size of the stopper 73, and workability of attaching and detaching work of the side face cover 40 can be enhanced more.

The present invention is not limited to the above described embodiments, and various modifications can be made within the range without changing the gist of the present invention. For example, in the actuators 1 and 2 according to the first and second embodiments, explanation is made on the example in which the screw shaft 10 is assembled to the ball screw nut via balls, with respect to the shaft member and the moving member, but the screw shaft 10 can be also screwed into the ball screw nut without using balls.

Further, in the actuators 1 and 2 according to the first and second embodiments, explanation is made on the case where the screw shaft 10 is adopted, with respect to the shaft member and the moving member, but various linear guide devices such as a spline device and a linear guide can be also adopted without being limited to the screw shaft.

Further, in the actuators 1 and 2 according to the first and second embodiments, explanation is made on the case where a magnet is used for the sealing portion 43, but closure of the top face cover 50 and the side face cover 40 may be performed by only contact without using a magnet, as long as the closure of the top face cover 50 and the side face cover 40 can be reliably performed. It is obvious from the statements of the claims that a mode in which such a modification or an improvement is added can be also contained in the technical range of the present invention.

REFERENCE NUMERALS 1, 2 Actuator
10 Screw shaft
20 Inner block
22 Ball screw nut
31, 31' First end portion member
32 Second end portion member
40 Side face cover
41 Top plate
42 Side plate
50 Top face cover
51 Opening portion
70 Posture retaining device
71, 71' Base point portion
72 Inclined surface
73 Stopper
80 Outer rail

The invention claimed is:

1. An actuator comprising:
a screw shaft with a first roller rolling groove in a spiral shape formed on an outer periphery;
an inner block where a screw hole through which the screw shaft penetrates is formed, and which has a second roller rolling groove that is formed on an outer periphery to be parallel with the screw shaft;
an outer rail that faces the second roller rolling groove; and
a plurality of rollers that are respectively arranged between the screw shaft and the inner block, and between the inner block and the outer rail, comprising:
a pair of side face covers that are laid between a pair of end portion members that are installed at both end portions of the screw shaft; and
a top face cover that is disposed to close an opening portion that is formed between the side face covers, and is opened parallel with the screw shaft,
wherein the side face covers each includes a top plate, and a side plate that hangs from one end along a width direction of the top plate,
the end portion members each has a posture retaining device that contacts internally a corner portion where the top plate and the side plate of a side face cover connect to each other, and
the posture retaining device comprises a base point portion that contacts the corner portion, and an inclined surface that extends while being slanted at a predetermined angle from the base point portion, and the top plate of each side face cover is disposed on the inclined surface of the posture retaining device when attaching and/or detaching the side face cover to and/or from the end portion members.

2. The actuator according to claim 1, wherein the posture retaining device allows the top plate to rotate around a rotation axis parallel with the screw shaft to a first direction to be toward the top face cover or away from the top face cover with the corner portion as a base point, at a time of attaching and detaching the side face cover, and
attachment of the side face cover is made in such a manner that the side face cover is allowed to contact the top face cover and the opening portion is closed by allowing the side face cover to internally contact the posture retaining device and then allowing the top plate to rotate around the rotation axis parallel with the screw shaft to a second direction to be toward the top face cover with the corner portion as the base point.

3. The actuator according to claim 1,
wherein the side face cover is provided to extend parallel with the screw shaft, and is fixed to the outer rail.

4. The actuator according to claim 3, wherein the posture retaining device allows the top plate to rotate around a rotation axis parallel with the screw shaft to a first direction to be toward the top face cover or away from the top face cover with the corner portion as a base point, at a time of attaching and detaching the side face cover, and
attachment of the side face cover is made in such a manner that the side face cover is allowed to contact the top face cover and the opening portion is closed by allowing the side face cover to internally contact the posture retaining device and then allowing the top plate to rotate around the rotation axis parallel with the screw shaft to a second direction to be toward the top face cover with the corner portion as the base point.

* * * * *